July 21, 1931.  A. F. STAMM ET AL  1,815,807
TORSIONAL VIBRATION DAMPER
Filed Nov. 21, 1929  2 Sheets-Sheet 2
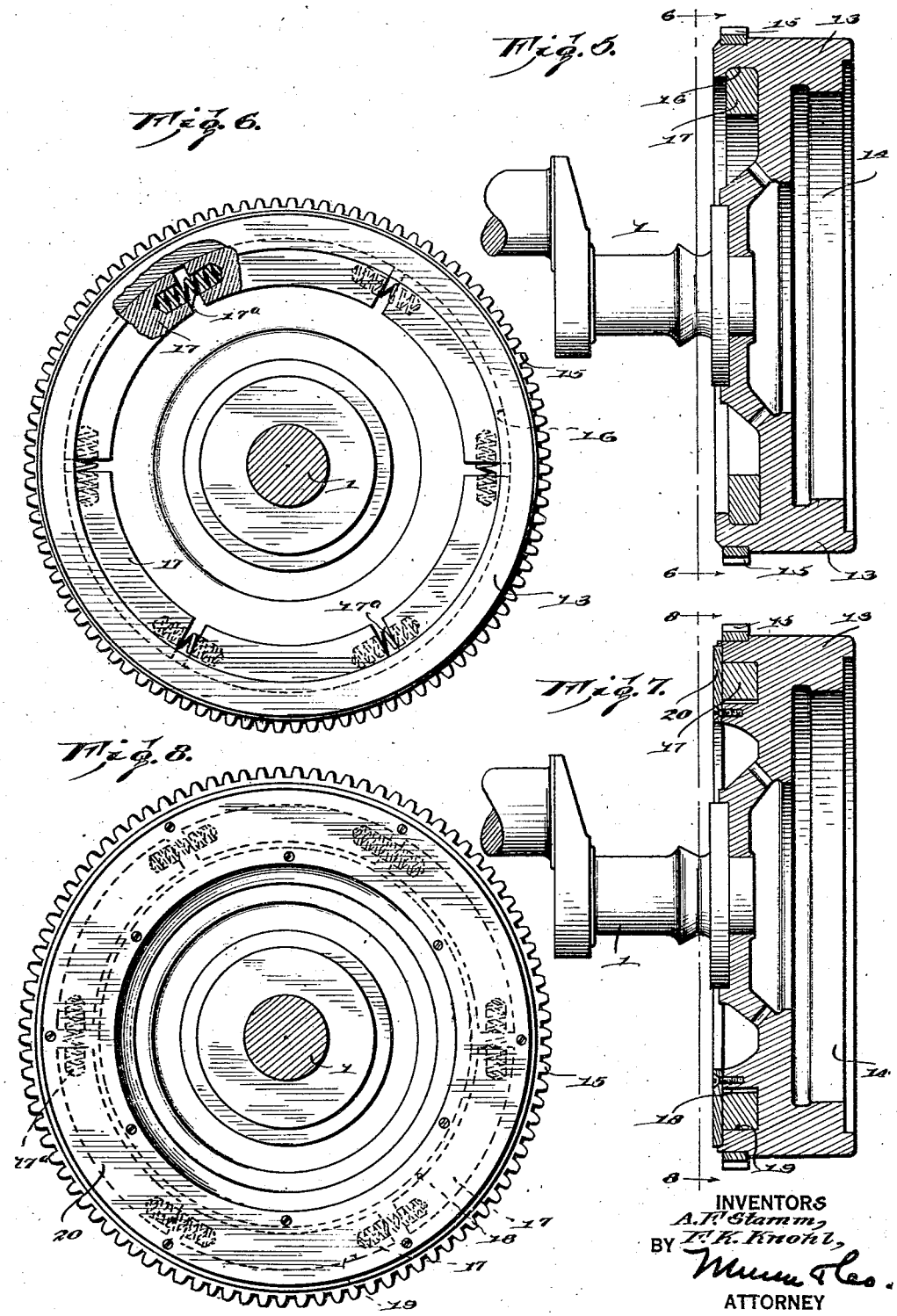
INVENTORS
A. F. Stamm,
BY F. K. Knohl,
ATTORNEY Patented July 21, 1931

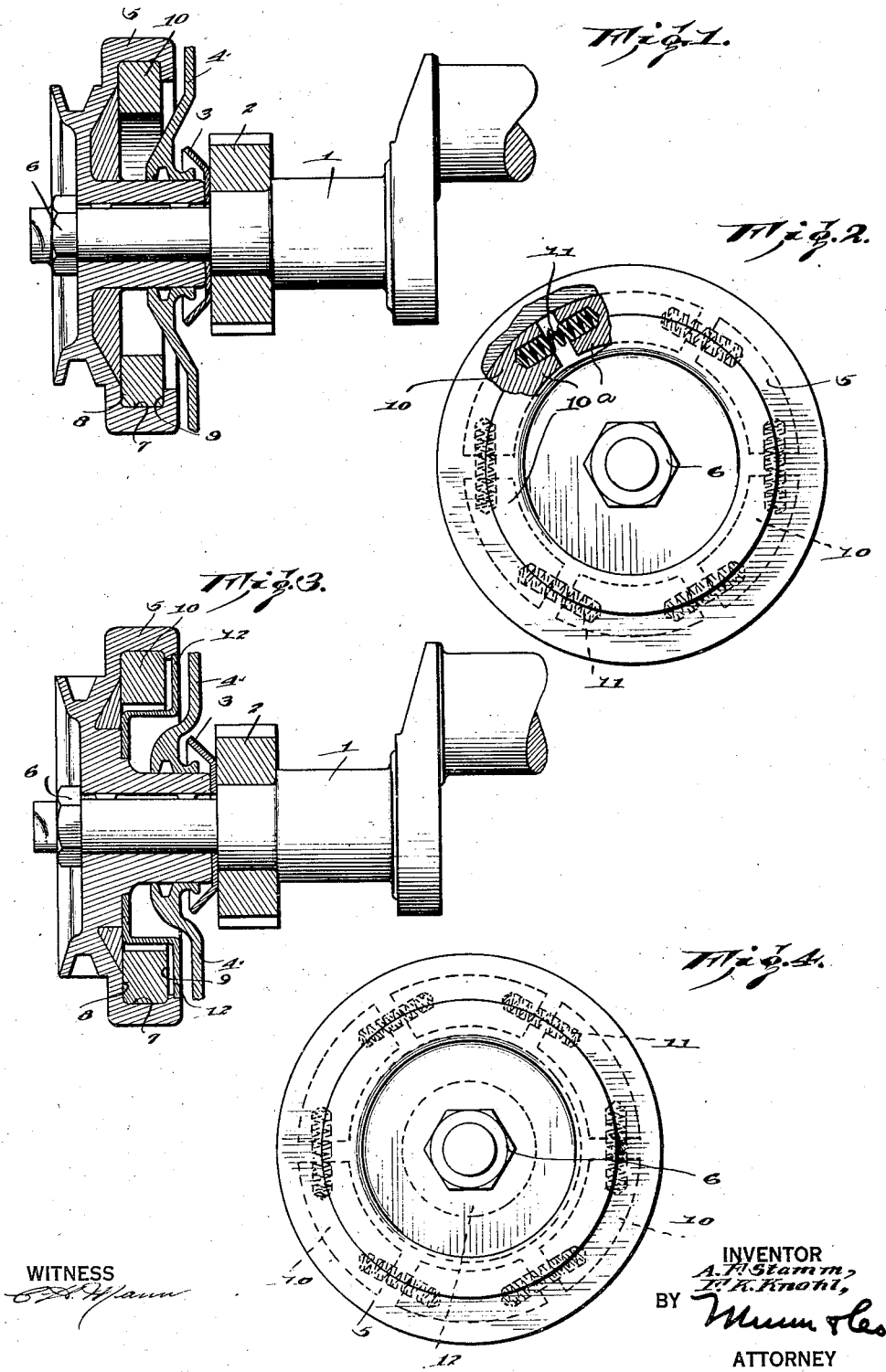

1,815,807

UNITED STATES PATENT OFFICE

ALEXANDER F. STAMM, OF DETROIT, MICHIGAN, AND FRIEDRICH K. KNOHL, OF FORT WAYNE, INDIANA, ASSIGNORS TO DEE STAMM

TORSIONAL VIBRATION DAMPER

Application filed November 21, 1929. Serial No. 408,900.

This invention relates to torsional vibration dampers for general use on shafts of any nature, more particularly for use on automobile engine, airplane engine, and other forms of combustion engine crank shafts and it consists in the construction, combinations and arrangements herein described and claimed.

It is common experience that shafts having masses of unequal size rotatable therewith and positioned therealong cause great vibration in the standards supporting said shafts. This is due to the unequal centrifugal forces exerted at the various points due to said masses, causing slight relative movement between the various parts of said shafts supporting said masses, in the nature of a twisting and untwisting motion of said shaft during its rotation. More particularly, it is noticeable in combustion engines used on automobiles, airplanes, and the like whereof the crank shaft supports at one end, a heavy fly wheel, a number of pitmen having reciprocable pistons connected thereto spaced along the shaft, and a light pulley and gear at the other end of said shaft. The twisting and untwisting of said shaft due to the unequal forces exerted by these members during its rotation causes vibration in the bearings supporting said shaft, said vibration extending throughout the frame of the automobile or other vehicle with obviously damaging results. It is therefore a primary purpose of the invention to provide a damper that will eliminate the torsional vibrations set up by shafts of this nature.

A further object of our invention is to provide a damper for said vibrations, whose dampening effect varies in accordance with the magnitude of said torsional vibrations.

A further object of our invention is to provide a torsional damper that is readily applicable to the usual forms of crank shafts now in use, without great modification thereof.

A further object of our invention is to provide a device of the type described which is easy to manufacture, has few parts and does not get out of order quickly.

Other objects and advantages will appear as the specification proceeds and the invention will be more particularly defined in the appended claims.

The device is illustrated in the accompanying drawings forming a part of this application in which:

Figure 1 is a sectional view of our device.

Figure 2 is a front elevational view of that form of the invention shown in Figure 1 with parts thereof being shown in section.

Figure 3 is a sectional view of a modified form of the device of Figure 1.

Figure 4 is a front elevational view of that form of Figure 3.

Figure 5 is a sectional view of a modified form of my device.

Figure 6 is a front elevational view of the form of Figure 5 with parts thereof being shown in section.

Figure 7 is a sectional view of a modified form.

Figure 8 is a front elevational view of a form of Figure 7.

In carrying out our invention, we make use of the well known physical fact that the centrifugal force exerted on a body varies directly as the square of the velocity with which said body rotates. In the case of an engine crank shaft, the reciprocable pistons acting thereon operating on their respective throws of the crank which have a rotary motion exert on the said arms supporting said throws a centrifugal force which varies directly as the square of the velocity of said throws. These pistons therefore act in the same manner as fly wheels, and since the mass of said pistons and their cooperating pitmen is not moved by said crank arm in a circular direction, the centrifugal force exerted on said throw further varies throughout each revolution. The magnitude of the vibrations caused by said twisting and untwisting of said shaft on the bearings thereof will vary, however, directly as the square of the velocities of the various masses rotated by this shaft. We therefore provide a torsional vibration damper rotatable with said shaft, acted upon by centrifugal force exerted during its rotation and therefore governed by the same law governing the forces exerted by the the masses which set up said vibrations, with consequent dampening of said vibrations at any speed of rotation.

In Figure 1 there is shown the front end of a crank shaft 1 having the usual timing shaft gear 2 connected thereto, an oil slinger 3 mounted before said gear 2, and an oil shield 4 positioned on said shaft as shown. These parts form no part of our invention. Mounted on the shaft 1 is a conventional form of fan belt pulley indicated at 5 and slightly modified in accordance with the invention. This pulley is retained on said shaft by a nut 6.

In applying the invention, we form the fan belt pulley 5 with an inner cylindrical track 7 defined by walls 8 and 9 at the side thereof. Mounted within this track and frictionally engaging the same are the weights or masses 10 constructed of any suitable material and secured in position by resilient means 11 which force the same into extended position and into frictional engagement with said track. These masses have their size so calculated that they engage the track 7 with sufficient force to frictionally dampen the torsional vibrations set up therein, and compose an annular mass generally designated at 10a of any suitable number of parts but shown as composed of six parts in the preferred embodiment.

In the embodiment of the invention shown in Figures 3 and 4, a housing plate 12 is positioned about the centrifugal damper for preventing the accumulation of grease, dirt and other foreign matter thereon with consequent loss in efficiency of operation.

From the foregoing description of the device, the operation thereof will be readily understood. During rotation of the shaft, the masses 10 according to Newton's Law of Inertia will rotate at constant speed while the track 7 frictionally engaging therewith will rotate at a variable speed due to the twisting and untwisting of the shaft to which it is attached by the unequal forces exerted at various points on said shaft, so that the velocity of said track at any given instant is not the same as the velocity at any other instant. The mass of the bodies 10 being so calculated that the frictional force exerted thereby on track 7 will oppose and overcome the variable forces tending to move said track at variable speeds thereby restrains the movement of said track and consequently said shaft to rotation at a constant velocity, the energy of the forces tending to rotate the track at a variable speed being dissipated in the form of heat generated by the frictional movement and engagement of the masses 10 with the track 7. Since the magnitude of the forces tending to accelerate and decelerate the shaft during its rotation exerted by the centrifugal forces acting thereon will vary directly as the square of the velocity with which said shaft is rotated and since the frictional force exerted by one part on another varies approximately directly as the force exerted normal to said engaging surfaces the frictional force exerted between the surfaces of the masses 10 and their cooperating track 7 will vary as the square of the velocity. This variation in the dampening force is due to centrifugal force. Therefore, the accelerating and decelerating forces tending to create such torsional vibrations will be dampened throughout the entire speed range of the motor. It is understood that any form of lubricant can be used between the frictionally engaging surfaces on the mass 10 and track if desired, thus further adjusting the device to various forms of crank shafts having variable forces exerted thereon by so controlling the co-efficient of friction existent therebetween.

In the form of the invention shown in Figures 5 and 6, the device is disclosed as mounted on the fly wheel 13 at the opposite end of a crank shaft 1. This fly wheel is of conventional form having a caved-out portion 14 for the reception of clutch members and a starting gear 15 thereon. In this form of the invention a track 16 similar to the track 7 is formed in said fly wheel for engagement with the masses 17 in exactly the same manner as track 7 engages the masses 10 in the preceding form of the device. The springs 17a retain the masses in operative position. In this modification of the device, the masses 17 may be so proportioned that they form a substantial part of the function performed by the fly wheel 13, thereby conserving energy.

The operation of this form of the device is exactly similar to the form of the preceding modification and is thought to be readily understood.

In that form of the device shown in Figures 7 and 8, the masses 7 are encased in the annular groove 18 having one wall 19 thereof forming a frictionally engaging track. The annular cover 20 excludes dust, dirt and other foreign matter from the operating parts of the device. This form of the invention is readily adaptable to the use of lubricant between the frictionally engaging surfaces as in the preceding form.

It is therefore seen that we have provided a torsional vibration damper that when properly proportioned to dampen and cancel out the torsional vibration at one engine speed will dampen and cancel out the torsional vibrations at any speed of said engine.

What is claimed is:—

1. A torsional vibration damper for use on rotatable shafts comprising a body member integral with said shaft and having an annular track, a plurality of segmental weights freely movable within said track and resiliently interconnected, whereby to increase or decrease the pressure between the contacting surfaces of said weights and track in proportion to the velocity of rotation of said shaft.

2. A torsional vibration damper for use on rotatable shafts comprising a body member integral with said shaft and having an annular track, a plurality of segmental weights freely movable in said track, each of said weights having a bore in the ends thereof, a helical spring seated in the bores of abutting weights to resiliently connect said weights, whereby said weights will be moved to increase or decrease the pressure between the contacting surfaces of said weights and track in proportion to the velocity of rotation of said shaft.

ALEXANDER F. STAMM.
FRIEDRICH KARL KNOHL.